US008473887B2

(12) United States Patent
Xiao

(10) Patent No.: US 8,473,887 B2
(45) Date of Patent: Jun. 25, 2013

(54) EVENT SCHEDULER FOR AN ELECTRICAL CIRCUIT DESIGN TO ACCOUNT FOR HOLD TIME VIOLATIONS

(75) Inventor: Tong Xiao, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 177 days.

(21) Appl. No.: 13/049,489

(22) Filed: Mar. 16, 2011

(65) Prior Publication Data

US 2012/0240089 A1 Sep. 20, 2012

(51) Int. Cl.
*G06F 17/50* (2006.01)

(52) U.S. Cl.
USPC ........... 716/113; 716/100; 716/101; 716/108; 716/110; 716/111

(58) Field of Classification Search
USPC .................. 716/100, 101, 108, 110, 111, 113
See application file for complete search history.

(56) References Cited

U.S. PATENT DOCUMENTS 5,943,490 A * 8/1999 Sample ........................... 703/28
6,009,256 A * 12/1999 Tseng et al. .................... 703/13
6,421,251 B1 * 7/2002 Lin ............................... 361/788
6,507,938 B1 * 1/2003 Roy-Neogi et al. .......... 716/113
6,754,763 B2 * 6/2004 Lin .............................. 710/317
6,810,442 B1 * 10/2004 Lin et al. ......................... 710/22
7,331,028 B2 * 2/2008 Dinter et al. .................. 716/113
7,458,049 B1 * 11/2008 Tuncer et al. ................. 716/113
7,469,394 B1 * 12/2008 Hutton et al. ................. 716/113
7,546,567 B2 * 6/2009 Cheon et al. .................. 716/113
8,230,283 B2 * 7/2012 Gillis et al. ................... 714/731

* cited by examiner

*Primary Examiner* — Sun Lin
(74) *Attorney, Agent, or Firm* — Polsinelli PC

(57) ABSTRACT

Implementations of the present disclosure involve an apparatus and/or method for identifying and classify nodes of an electrical circuit design to account for hold time violations occurring within the circuit. The nodes may be ordered based on a criticality of the nodes that may aid in identifying those nodes of the circuit where hold time violations may be corrected. In one embodiment, the criticality may relate to the number of potentially violating paths that utilize the identified nodes such that corrective measures applied at those nodes may correct several hold time violating paths. In addition, criticality may be scaled utilizing an available buffer library and other timing information. Thus, by utilizing the methods and/or apparatuses of the present disclosure, the locations where timing violation corrective measures may be applied that improve or correct several violating data paths at once may be identified in such a manner so as to reduce the number of overall corrections made to the circuit design, reducing the cost and necessary time associated with the corrections.

20 Claims, 11 Drawing Sheets

DETERMINE NODES OF THE CIRCUIT WITH MINIMUM TIMING VIOLATIONS 110

COMPUTE NODE CRITICALITY OF EACH DETERMINED NODE 120

BUILD DATA SET OR BUCKET OF DETERMINED NODES BASED ON NODE CRITICALITY 130

GENERATE CHANGE EVENT QUEUE TO FIX TIMING VIOLATIONS BY SELECTING NODES FROM DATA SET 140

EXECUTE CHANGE EVENT QUEUE 150

RECOMPUTE TIMING OF CIRCUIT AND REITERATE IF TIMING VIOLATIONS REMAIN 160

EVENT SCHEDULER FOR AN ELECTRICAL CIRCUIT DESIGN TO ACCOUNT FOR HOLD TIME VIOLATIONS

FIELD OF THE INVENTION

Aspects of the present invention relate to design of electrical circuits. More particularly, aspects of the present invention involve an apparatus and method for identifying and classifying one or more nodes corresponding to hold time violations of the circuit design for purposes of rectifying the violations in a component-efficient manner so as not to break setup time constraints.

BACKGROUND

Due to the complex nature of microchip circuit design, clock signals often become skewed at one or more components within the circuit design such that data signals may arrive at a component before the respective clock signal arrives. When the data signal arrives too early with respect to a clock signal at a latch or flop device, a hold time violation occurs within the circuit. When a hold time violation occurs within an electrical circuit, the data transmitted on the data signal may not be latched or stored in the flop device correctly resulting in lost data signals and, ultimately, failure of the microchip design.

Hold time violations are often corrected in the design phase of the circuit by slowing down the data path or speeding up the clock signal. However, in the later stages of many circuit designs, changing the clock network is often not a viable option such that correction of hold time violations can be fixed through the addition of delay elements within the data signal path. In general, data signals may be delayed by inserting a buffer element or swapping devices along the data path with a different sized element to slow down the data signal. However, because these corrections often occur in the later stages of the circuit design, it is often desirous to minimize the number of alterations made to the design as any change in the design may have far-reaching impact on the design cost. In addition, the microchip design can also generally account for any setup time violations (i.e., the desired executing speed of the electrical circuit) such that the addition of too many delay elements into the circuit design may cause the execution speed of the circuit to fall below the maximum allowed time. Thus, what is needed is a method to efficiently select nodes of a microchip design to correct one or more hold time violation that minimizes the number of alterations and changes made to the design without breaking setup time constraints for the design.

SUMMARY

One implementation of the present disclosure may take the form of a method for accounting for one or more hold time violations of an electrical circuit design. The method may comprise the operations of analyzing an electrical circuit design to determine one or more hold time violations, associating a criticality to one or more nodes of the electrical circuit design, the criticality relating to the number of hold time violations determined at the one or more nodes and storing indicators of the one or more nodes and the associated criticality of the one or more nodes in a data set. Further, the method may also include the operations of generating a change event queue to account for the one or more hold time violations based on the associated criticality of the one or more nodes in the data set and altering the electrical circuit design based on the change event queue to account for the one or more hold time violations of the electrical circuit design.

Another implementation of the present disclosure may take the form of a computing device for designing an electrical circuit. The computing device may comprise a processing device and a computer-readable medium having stored thereon data representing sequences of instructions that, when executed by the processing device, cause the processing device to perform certain operations. Such operations may comprise detecting one or more hold time violations of an electrical circuit design at one or more endpoints of the electrical circuit design, tracing along at least one data path for each of the one or more hold time violations, the at least one data path comprising one or more nodes of the electrical circuit design and computing a criticality for the one or more nodes of each of the at least one data paths, the criticality associated with the number of data paths associated with the one or more nodes. The operations may also include creating a data set comprising indicators of the one or more nodes and the computed criticality of the one or more nodes, ordering the data set based on the criticality of the one or more nodes, generating a change event to add a delay component in the electrical circuit design at a first node of the one or more nodes in the data set and adding the delay component to the electrical circuit design based on the change event.

Yet another implementation of the present disclosure may take the form of a method for designing a microchip. The method may comprise the operations of detecting one or more endpoints of a microchip design, the endpoints comprising inputs to a state-storing device and the outputs of the microchip design, locating at least one data path for each of the one or more endpoints, the at least one data path comprising one or more nodes of the microchip design, creating a path identifier for the at least one data path for each of the one or more endpoints and assigning the path identifier to the one or more nodes for the at least one data path. The operations may also include computing a criticality for the one or more nodes of each of the at least one data paths with the criticality associated with the number of data paths associated with the one or more nodes, creating a bucket data set associated with the computed criticality of the one or more nodes of each of the at least one data paths, accessing the bucket data set to generate a change event for at least one of the one or more nodes and adding an electrical component to the microchip design in response to the change event.

DETAILED DESCRIPTION

Figure 1:
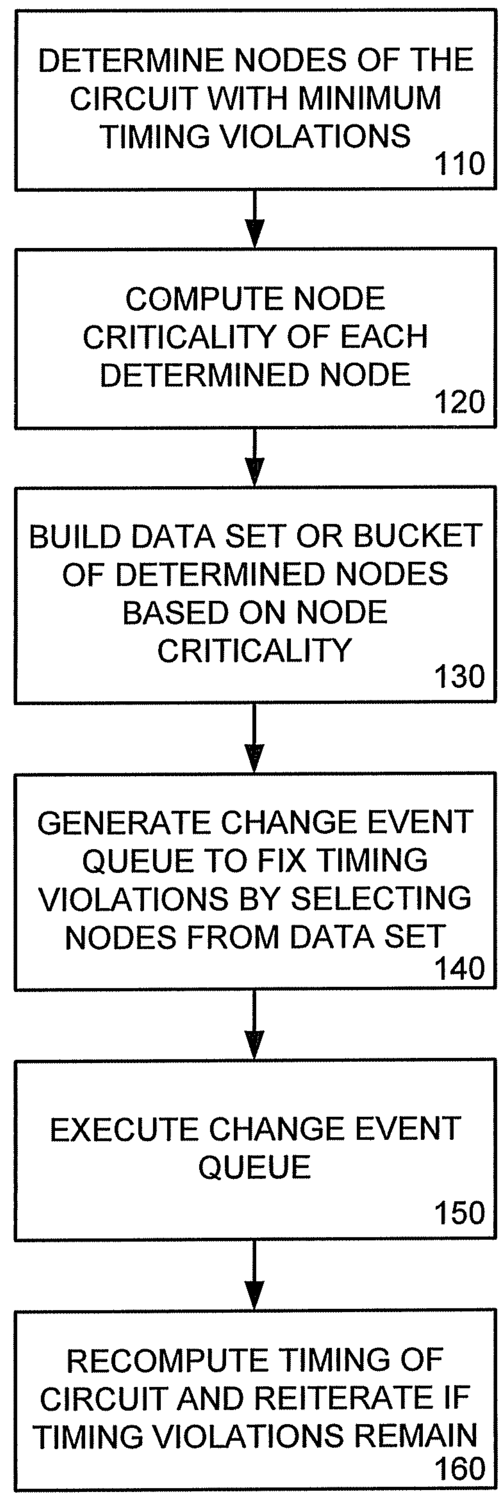
FIG. 1 is a flowchart of a method for identifying nodes of an electronic circuit design where alterations of the circuit may be made to correct one or more hold time violations that reduces or minimizes the number of alterations made to the circuit design.

Implementations of the present disclosure involve an apparatus and/or method for identifying and classifying nodes of a microchip or microprocessor design to account for the hold time violations occurring within the circuit. The nodes may be categorized or ordered based on a criticality of the nodes that may aid in identifying those nodes of the circuit where hold time violations may be corrected. In one embodiment, the criticality may relate to the number of potentially violating paths that utilize the identified nodes such that corrective measures applied at those nodes may correct several hold time violating paths. Thus, by utilizing the methods and/or apparatuses of the present disclosure, the locations within the circuit design where timing violation corrective measures may be applied that improve or correct several violating data paths at once may be identified in such a manner so as to reduce the number of overall corrections made to the circuit design, reducing the cost and necessary time associated with the corrections without creating any new setup time violations.

In one implementation, the identified nodes of the circuit may be stored in a data set called a bucket. In addition, the nodes may be stored in descending order in the bucket based on the criticalities associated with the nodes, such that the identified nodes with the highest scaled criticality may be stored at the top of the bucket. Once ordered, the apparatus and/or method may select the node or nodes with the highest scaled criticality as locations for one or more delay elements to account for the hold time violations occurring along the data path associated with the node or nodes. The selected delay elements and locations within the electrical circuit may be added to an event scheduler for inclusion in the design. Further, upon generation of the scheduled event, the microchip design may be updated accordingly and a new analysis of the timing of the circuit may be performed. The above operations may be repeated for a plurality of nodes in the bucket until all hold time violations of the microchip circuit design are accounted for.

In general, the methods and/or apparatuses described herein may be utilized for any electrical circuit that includes a clock signal and one or more state-storing device, such as a latch or flip-flop. More particularly, the present disclosure may be utilized in a circuit design that may include a minimum ("min") timing violation such that a data signal is lost due to a skewed clock signal at one or more state-storing device. Thus, while the description included herein provides an example of a microchip circuit design, it should be appreciated that the operations described may similarly be applied to any electrical circuit design. In addition and as described in more detail below, the operations described herein may be performed by any computing device or processing device in response to one or more instructions. Thus, in one example, the methods may be performed by the same computing device that analyzes the circuit and provides timing information concerning the circuit paths. In another example, the methods may be performed by a computing device utilized to interface with a designer that may create and/or layout the electrical circuit. In still another example, the methods may be performed by a computing device that is not otherwise utilized in other phases of the circuit design.

FIG. 1 is a flowchart of a method for identifying nodes of an electronic circuit design where alterations of the circuit may be made to correct one or more hold time violations that reduces or minimizes the number of alterations made to the circuit design. As mentioned, the operations of FIG. 1 may be performed by any computing device or processing device. In the example used below, the computing device may be the same computing device utilized to analyze and provide timing information of the circuit to a designer of the device. In addition, the computing device may further be configured to alter the circuit design and perform additional timing analysis of the circuit based on the altered design.

Figure 3A:
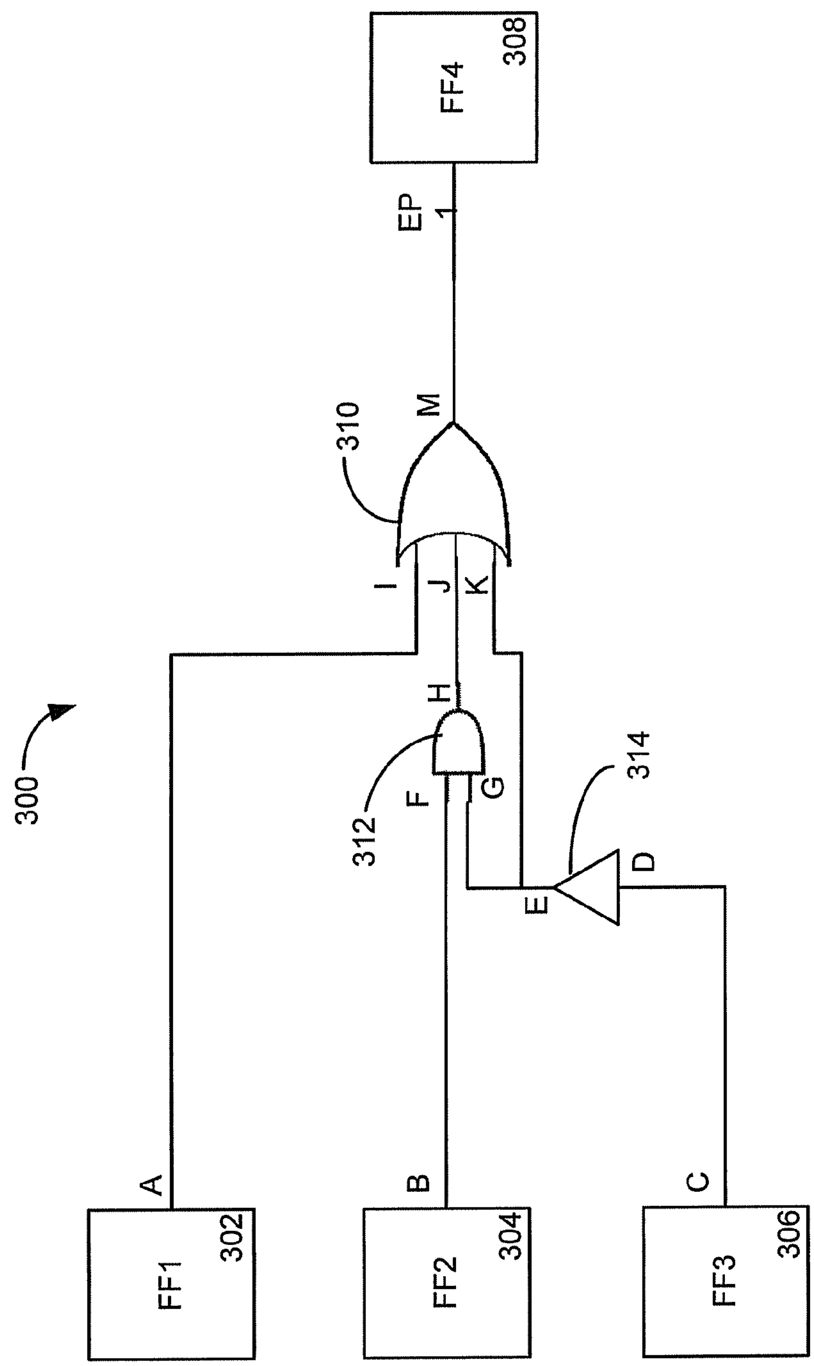
FIG. 3*a* is a diagram illustrating an exemplary electronic circuit design that may include one or more hold time violations that may be corrected through the embodiments described herein.

Beginning in operation 110, the computing device may first determine one or more nodes of the circuit where a hold time violation is detected. A node of an electrical circuit design is an input or output pin of an electrical component of the circuit, or an input or output port of a design. For example, FIG. 3*a* is a diagram illustrating an exemplary electronic circuit 300 design that may include one or more hold time violations at the nodes of the circuit 300. The circuit 300 may include any number and type of electronic component. In the circuit 300 shown, FF1 302, FF2 304 and FF3 306 represent input flip flop electrical components to the circuit 300, and FF4 308 represents a receiving flip flop. In addition, the flip flops of the circuit 300 may be interconnected in the following manner. The output of FF1 302 is electrically connected to a first input to a three-input or gate 310. The output of FF2 304 is electrically connected to a first input of an and gate 312. The output of FF2 306 is electrically connected to an inverter 314, with the output of the inverter electrically connected to a second input to the and gate 312. The output of the and gate 312 is electrically connected to a second input to the three-input or gate 310, while the output of the inverter is also electrically connected to a third input to the three-input or gate. The output of the three-input or gate 310 is connected to the input of FF4 308. As should be appreciated, the circuit 300 of FIG. 3*a* is for example only. The embodiments described herein may be applied to any type of electronic circuit design, including any number of components interconnected in any manner.

In general, the nodes of the circuit 300 are identified as nodes A-EP1. As mentioned above, a node of an electrical circuit design is an input or output pin of an electrical component of the circuit, or an input or output port of a design. For the circuit of FIG. 3*a*, the nodes correspond to the input and output pins of the electrical components of the circuit. More particularly, node A corresponds to the output of FF1 302, node B corresponds to the output of FF2 304 and node C corresponds to the output of FF3 306. In addition, the input pin of the inverter 314 corresponds to node D, while the output pin corresponds to node E. The input pins of the and gate 312 correspond to node F and node G, while the output pin corresponds to node H. The input pins of the three-input or gate 310 correspond to node I, node J and node K, while the output pin corresponds to node M. In addition, the input to FF4 308 corresponds to endpoint EP1. In general, timing information may be analyzed and obtained for the nodes of the electrical circuit 300. Thus, a typical timing analysis of a circuit may provide timing information for the one or more nodes of the circuit such that any timing violations at any particular node of the circuit may be determined. One such timing violation that may be detected is a hold time violation at the nodes of the circuit design, as obtained in operation 110. The identification of timing violations of a circuit 300 is described in more detail below with reference to FIG. 3*b*.

Returning to FIG. 1, once the nodes of the circuit that have a hold time violation are determined, the computing device may compute a criticality for each determined node in operation 120. In general, the criticality of a node of the circuit may relate to the number of hold time violating paths that utilize that particular node in the data path. As should be appreciated, a node may be a part of several data paths through the electrical circuit and one or more of those data paths may include a timing violation. Thus, depending on the circuit design, a node may be associated with any number of hold time violating data paths, known herein as a node criticality. The calculation of the node criticality is explained below in more detail with reference to the flowchart of FIGS. 2 and 4.

Figure 5:
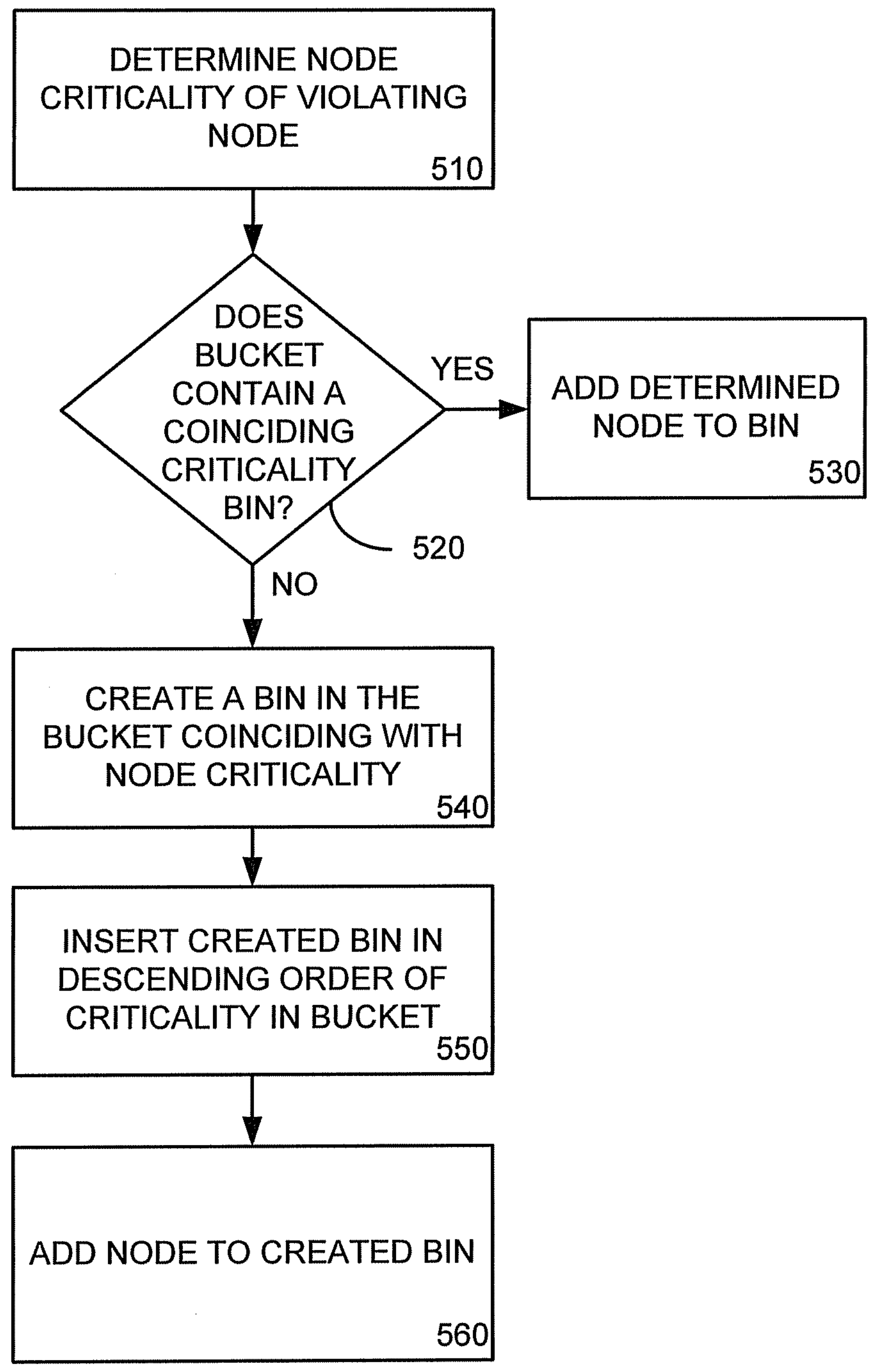
FIG. 5 is a flowchart of a method for creating a data set comprising one or more nodes of an electronic circuit and ordering said nodes based on the criticality of one or more nodes.

Upon determination of the criticality of one or more nodes of the circuit, the computing device may create a data set, referred to herein as a bucket, to maintain the identified nodes and the respective criticalities of the nodes in operation 130. In one embodiment, the bucket may include a plurality of bins, such that the bins contain nodes of similar criticality. For example, nodes with a criticality of two may be grouped together within the bucket in the same bin. Further, the bins within the bucket may be further sorted based on the node criticality. In one example, the bins may be sorted by descending order of criticality, such that those bins containing nodes of the highest criticality are located at the top of the bucket. In general, however, the bucket may be any type of data set stored in a computer-readable medium and accessible by the computing device for maintaining a list of the identified nodes the criticalities of said nodes. The creation and sorting of the bucket data set is explained below in more detail with reference to the flowchart of FIG. 5.

Once the data set or bucket of node criticality is created in operation 130, the computing device may then generate a change event to alter one or more nodes from the data set to fix one or more hold time violations of the circuit. In general, any node from the bucket may be selected and processed by the computing device to generate a change event at the selected node. For example, in one embodiment, the computing device may select a node from the top bin of the bucket (i.e., a node with the highest criticality) and schedule a change event at that node to account for one or more hold time violations of the circuit. As mentioned above, a change event may include adding a delay into the data path at the selected node, such as by adding a delay device or swapping a component of the circuit with slower device. In this manner, the scheduled change event may correct one or more hold time violating paths at the selected node by delaying the data path to arrive at a state-storing device at or near the corresponding clock signal such that the data signal is properly stored in the state-storing device.

Additionally, the computing device may perform operation 140 of FIG. 1 for a single or for multiple nodes in the bucket data set. For example, a change event may be scheduled for the most critical node only in the bucket in operation 140. Alternatively, operation 140 may be performed for all of the nodes in the bucket to account for most or all of the hold time violations. In general, however, all hold time violations for a microchip design are typically considered during the design phase of a microchip. Thus, although not required, a plurality of nodes from the bucket may be selected and a change event added to the change event queue in operation 140 to fix the hold time violations of the circuit design. The generation of the change event queue is described below in more detail with reference to the flowchart of FIG. 9.

In operation 150, the change event queue may be executed, resulting in the addition of one or more delay elements into the microchip design, the swapping of one or more elements of the design with a slower element, or any other design alteration to account for one or more hold time violations of the design. In general, the execution of the change event queue may occur logically during the design and layout of the circuit by a computing device or by a circuit design utilizing a computing device. In operation 160, the computing device (or a separate computing device) may perform an additional timing analysis of the design and note any remaining hold time violations. If any hold time violations remain, the operations of FIG. 1 may be repeated until all hold time violations are accounted for and corrected. In this manner, the computing device may identify and classify nodes of a microchip design to account for one or more hold time violation such that the number of design alterations is minimized or reduced.

Figure 2:
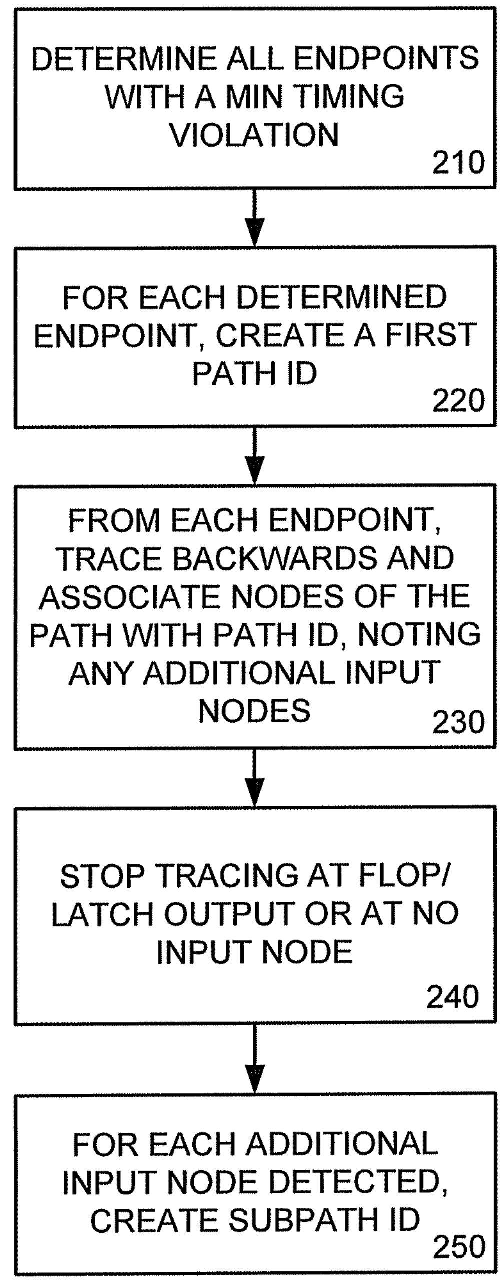
FIG. 2 is a flowchart of a method for associating one or more nodes of an electronic circuit design with an initial path identification for purposes of determining a criticality of the one or more nodes of the electronic circuit design.
Figure 4:
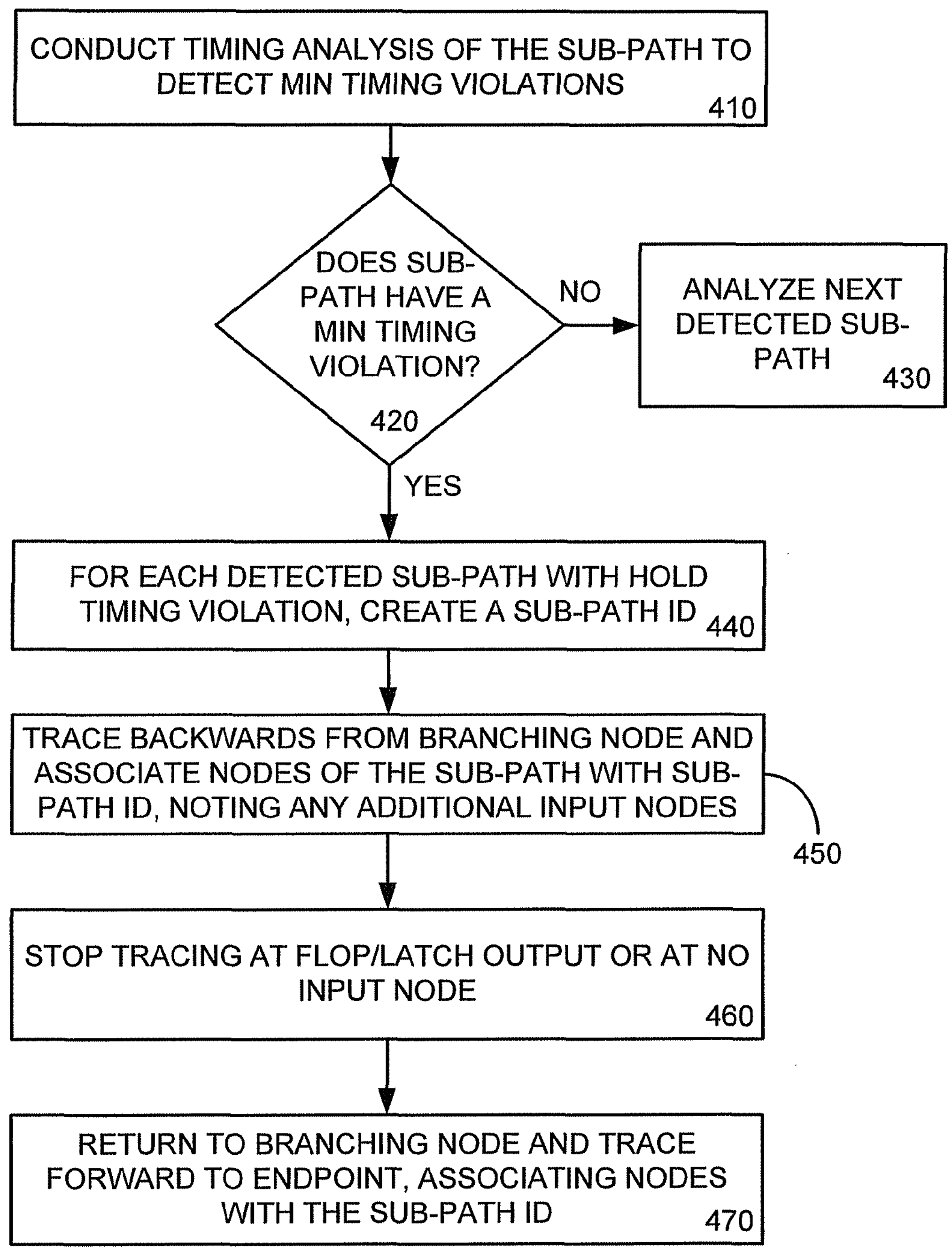
FIG. 4 is a flowchart of a method for associating one or more nodes of a sub path that branch from an initial timing violating path with a sub path identification for purposes of determining a criticality of the one or more nodes of the electronic circuit design.

As outlined above in relation to operations 110 and 120, the computing device may account for hold time violations of a circuit by identifying the nodes of a circuit with a hold time violation and assigning a criticality to one or more of those nodes. As mentioned, the criticality of a node may relate to the number of hold time violating paths that utilize the node. FIGS. 2 and 4 provide flowcharts for a method for identifying violating nodes and determining the number of violating paths utilizing each node, or the node's criticality. More particularly, FIG. 2 is a flowchart of a method for associating one or more nodes of an electronic circuit design with an initial path identification for purposes of determining a criticality of the one or more nodes of the electronic circuit design. FIG. 4 is a flowchart of a method for associating one or more nodes of a sub path that branch from an initial timing violating path with a sub path identification for purposes of determining a criticality of the one or more nodes of the electronic circuit design. In general, the operations of FIGS. 2 and 4 may be performed by a computing device, as outlined above with reference to the flowchart of FIG. 1.

To begin to determine the criticality of the nodes of the circuit design, the computing device may first determine the endpoints in the design that have a hold time violation in operation 210. As mentioned above, a typical timing analysis of a circuit may provide timing information for one or more nodes of a circuit design. This information may be utilized by the computing device to determine the endpoints in the circuit design that include one or more hold time violations. In general, an endpoint may be defined as an input to a state-storage device of the circuit, such as an input to a latch or flip-flop, or a primary output for the circuit. For example, returning to the circuit 300 in FIG. 3*a*, an endpoint may be identified as the input to the flip-flop designated as FF4 308.

In the exemplary circuit, the endpoint is designated "EP1." Timing information may be obtained or provided for the endpoints of the circuit such that the computing device may determine which endpoints of the circuit include hold time violations. In addition to the timing information at the endpoints, timing information may also be obtained for any node in the circuit. As stated above, a node is defined as an input or output of an electrical component of the circuit, as well as any input or output port of the circuit. Therefore, timing information may be obtained by the computing device for any node of the circuit, as well as for any path utilizing a plurality of nodes.

Figure 3B:
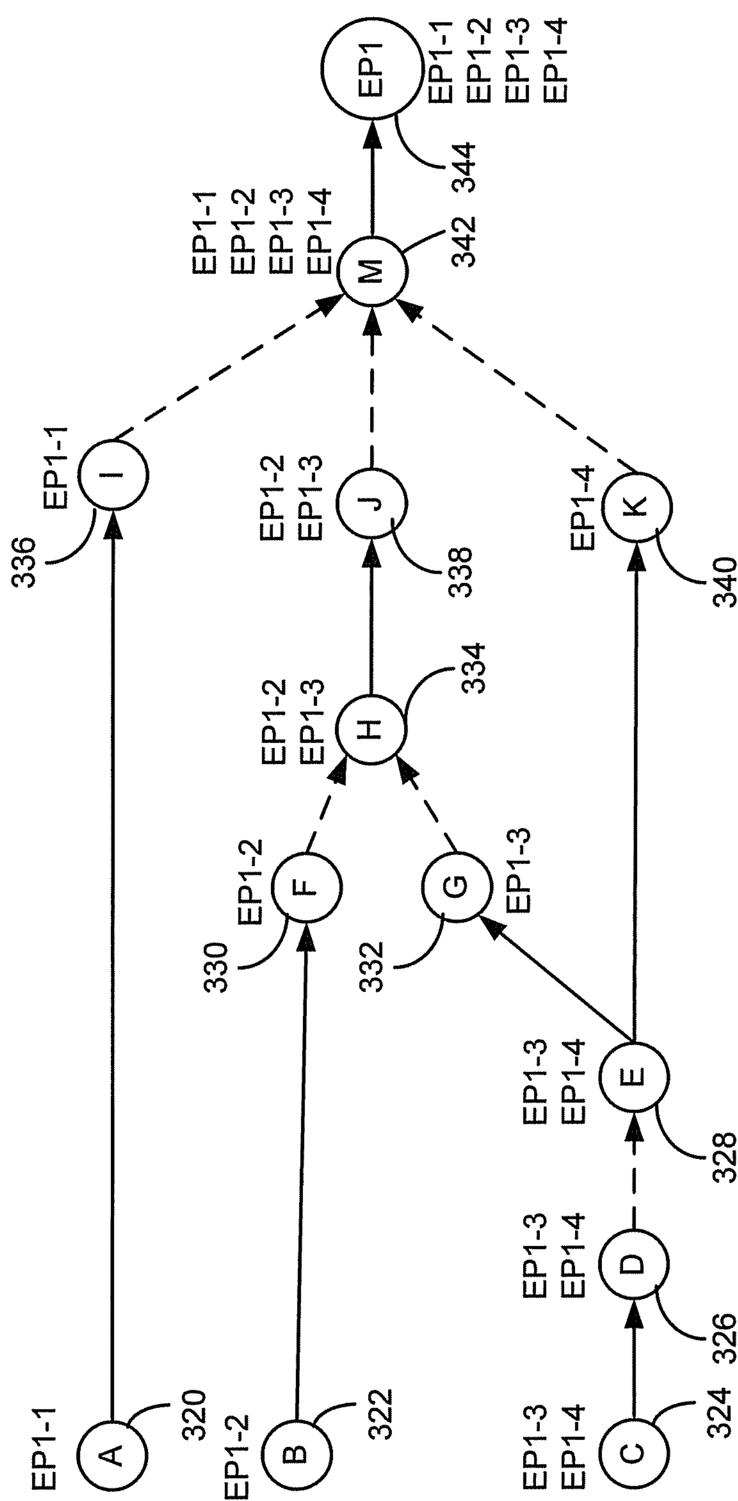
FIG. 3*b* is a diagram illustrating a data path of the electronic circuit design of FIG. 3*a* through several nodes of the circuit, with each illustrated node being associated with one or more detected hold time violation paths.

Once the endpoints of the circuit with one or more hold time violations has been determined, the computing device may create a path identification (path ID) for each determined endpoint in operation 220. For example, FIG. 3*b* is a diagram illustrating a data path of the electronic circuit design of FIG. 3*a* through several nodes of the circuit, with each illustrated node being associated with one or more detected hold time violation paths. In FIG. 3*b*, the circles represent nodes identified in the circuit 300 of FIG. 3*a*. Also, the arrows connecting the circles illustrated in FIG. 3*b* represent the flow of one or more data signals through the data path. More particularly, the solid line arrows represent connections between components while dashed line arrows represent connections from an input pin of a component to the output pin of the same component. For example, data may flow from node A 320 (corresponding to the output of FF1 302) to node I 336 (corresponding to the first input of the three input or gate 310), as indicated by the solid line arrow connecting the nodes. In another example, the dashed line arrow connecting node D 326 (corresponding to the input of the inverter 314 of FIG. 3*a*) to node E 328 (corresponding to the output of the inverter) may represent a signal that propagates through and is processed by a component between node D and node E. Also, some nodes of the circuit may have multiple inputs and/or multiple outputs. For example, node E 328 of FIG. 3*b* has two output data paths, one connecting to node G 332 and another connecting to node K 340. This corresponds to the output of the inverter 314 of FIG. 3*a* being electrically connected to the second input of the and gate 312 and the third input of the three-input or gate 310. Thus, data flowing from the output of the inverter 314 (shown as node E 328 in FIG. 3*b*) may be transmitted to both node G 332 and node K 340. Similarly, some nodes may have multiple inputs, such as at node H 334 (corresponding to the output pin of the and gate 312 of FIG. 3*a*), as indicated by the plurality of arrows terminating that those nodes. In this manner, the diagram of FIG. 3*b* may represent a simplified flow diagram for the electrical circuit shown in FIG. 3*a*. It should be appreciated, however, that such a diagram for complex circuit design may have several additional interconnected nodes for which timing information may be obtained, including several additional endpoints. Thus, the diagrams of FIGS. 3*a* and 3*b* are simplified for ease of description of the methods and apparatuses of the present disclosure.

In addition to the nodes of the electrical circuit, endpoint EP1 344 is also shown in FIG. 3*b*. As stated above, an endpoint may represent an input to a state-storing device of the circuit or an output of the circuit and may be a terminating point for one of more data paths, such as those shown in FIG. 3*b*. In addition, endpoint EP1 344 may be determined by the computing device as an endpoint with a hold time violation in operation 210 of the flowchart of FIG. 2. In other words, one or more data signals arriving at endpoint EP1 344 may not be stored in the associated state-storing device as the data arrives prior to the related clock signal to enter the data into the device. Further, these data signals may arrive through any of the illustrated data paths through the nodes of FIG. 3*b*. In response to the computing device determining that one or more hold time violations are present at endpoint EP1 344, the computing device may create a path ID for the endpoint. One path ID is shown in FIG. 3 as "EP1-1". However, it should be appreciated that the path ID may be any data structure that identifies a path containing a hold time violation to the computing device. Thus, the path ID may comprise any sequence of numbers or any other alphanumeric character such that the computing device may distinguish a hold time violating path and the one or more endpoints of the circuit.

The path ID created in operation 220 may also be associated with other nodes of the violating path by the computing device in operation 230. To associate the path ID with the other nodes of violating data path, the computing device may begin to trace the data path backwards from the endpoint along the detected violating path. For example, beginning at endpoint EP1 344 of FIG. 3*b*, the computing device may trace back through the violating data path as determined by the obtained timing information, such that the computing device may determine node M 342 as the previous node in the violating path. The computing device may also associate the path ID with the nodes of the violating data path in operation 230. Thus, the path ID "EP1-1" may be associated with node M 342 by the computing device as part of the violating data path. In addition, the computing device may note any additional inputs to any node encountered during the back-tracing of the violating path. For example, the computing device may note that node M 342 has three inputs, namely from node I 336, node J 338 and node K 340. However, for some analysis, only information for one particular violating data path may be provided by the timing analysis. Thus, to determine timing violations for every node in the circuit, sub paths related to the endpoint may also be analyzed. To facilitate this, the additional input information to any encountered node may be stored or otherwise maintained by the computing device for use in determining any sub paths associated with a particular endpoint. The sub path determination is discussed in greater detail below with reference to FIG. 4.

In addition, the computing device may continue to back trace the violating data paths form the endpoint for all nodes of the violating data path, associating the path ID with each node on the path. For example, the computing device may back-trace the violating data path to node I 336 and associate the path ID EP1-1 with node I. Similarly, node A 320 may also be associated with the path ID EP1-1 as part of the violating path. In this manner, the computing device may continue to back trace the violating path until an output of a state-storing device is encountered or a node is encountered with no input, as illustrated in operation 240. For example, node A 320 of FIG. 3*b* is the output of a state-storing device flip-flop. In other embodiments, node A 320 may be an input to the circuit itself, thereby being a "no input node". Thus, the computing device may cease back tracing the violating data path at node A 320. As a result, node path A-I-M-EP1 may be associated with path ID EP1-1 indicating this data path as one hold time violating path for endpoint EP1.

In operation 250, the computing device may create and assign a sub path ID for each additional input detected by the computing device during the back trace of the violating path in operation 230 above. The method for associating one or more nodes of a sub path that branch from an initial path with a sub path identification for purposes of determining a criticality of the one or more nodes of the microchip design is shown in the flowchart of FIG. 4. The operations described in relation to FIG. 4 may be performed by the computing device for each additional input noted in operation 230 of FIG. 2.

To associate a sub path ID with the violating sub path related to an endpoint of an electrical circuit, the computing device may first conduct a timing analysis on the detected sub path in operation 410. For example, returning to FIG. 3*b*, the computing device may have noted during back tracing that node M 342 includes three inputs, with the inputs from node J 338 and node K 340 as potential sub paths from the initial path through node I 336 determined in FIG. 2. Thus, the computing device may perform a timing analysis along the sub path from node J 338 to the endpoint EP1 344 in operation 410 to determine if a hold time violation occurs in operation 420. If no hold time violation is present on the sub path, the computing device may skip that particular sub path and begin analyzing another detected sub path, as illustrated in operation 430. For example, if no hold time violation occurs along the sub path from node J 338 to endpoint EP1 344, the computing device may then conduct a timing analysis for the input from node K 340. If no other additional inputs are noted by the computing device, than the criticality determination of the nodes associated with the endpoint may be complete. However, if the sub path does include a hold time violation, the computing device may create a sub path ID for the sub path in operation 440. In the example of FIG. 3*b*, the sub path ID may take the form of sub path ID "EP1-2".

Once the sub path ID is created, the computing device may, in operation 450, trace back along the sub path and associate the sub path ID with the determined nodes of the sub path, similar to operation 230 described above with reference to FIG. 2. For example, the computing device may associate the sub path ID "EP1-2" with node J 338, node H 334, node F 330 and node B 322. In addition, the computing device may also note any additional input nodes encountered while tracing back along the violating sub path. For example, the computing device may note that node H 334 includes two inputs, namely an input from node F 330 and an input from node G 332. Thus, an additional sub path associated with the multiple inputs to node H 334 may be created and analyzed for the input from node G 332, as explained in more detail below.

The computing device may continue to back trace the violating sub path until an output of a state-storing device is encountered or a node is encountered with no input, as illustrated in operation 460. For example, node B 322 of FIG. 3*b* is the output of a state-storing device, namely FF2 of FIG. 3*a*. Thus, the computing device may cease back tracing the violating sub path at node B 322. In operation 470, the computing device may return to the branching node where the sub path was first detected and propagate the sub path ID forward to the endpoint. For example, the computing device may forward the sub path ID "EP1-2" from node M 342 to EP1, resulting in a violating sub path B-F-H-J-M-EP1 associated with sub path ID EP1-2.

In addition, the operations of FIG. 4 may be repeated for each noted sub path associated with an endpoint. Thus, using the example of FIG. 3*b*, sub paths EP1-3 and EP1-4 may also be associated with the various sub paths of endpoint EP1 314. More particularly, sub path C-D-E-G-H-J-M-EP1 may be associated with sub path ID EP1-3 and sub path C-D-E-K-M-EP1 may be associated with sub path ID EP1-4 through the operations of the method of FIG. 4. In general, once all of the violating paths and nodes associated with an endpoint are determined, the criticality of those nodes may be set. As mentioned above, the criticality of a node of a circuit may relate to the number of hold time violating paths utilizing the node. Thus, by associating the path and sub path IDs with the nodes, the number of violating paths utilizing the nodes may be determined. For example, node D 326 of FIG. 3*b* has two violating paths associated with the node, namely EP1-3 and EP1-4. Node B 322 has only one violating path associated with it, namely EP1-2. Therefore, the criticality of node D 326 may be set as "two" while the criticality of node B 322 may be set as "one". Further, once determined by the computing device, the criticality of the nodes may be stored and organized in a data set or bucket, as explained below with reference to the flowchart of FIG. 5.

Once the criticality of the nodes of the circuit is determined, the computing device may store and/or order the nodes in a data set or bucket based on said criticality. In general, the bucket may be any data set configured to store information concerning one or more nodes of the circuit. Thus, the bucket may be one or more strings of bits stored in a computer-readable storage medium accessible by a computing device. Further, it should be appreciated that the bucket may take any digital form understood by the computing device for storing information. In one embodiment, the bucket may be further divided into bins or other divisions based on the criticality of the nodes within the bucket, such that nodes with similar criticalities are grouped together in a bin. For example, the nodes of the circuit with a criticality of two may be grouped together within a bin in the bucket data set. In general, however, the node information may be stored in any fashion in the data set that may aid the computing device in selecting and processing the identified nodes, including or not including sub divisions within the data set.

To begin creating and organizing the node information in a data set, the computing device may, in operation 510, determine the criticality of one or more nodes of the circuit, as outlined above with reference to FIGS. 2 through 4. For example, utilizing the diagram of FIG. 3*b*, the computing device may begin by selecting any node, such as node D 326, for inclusion in the bucket. As determined above, node D 326 has a criticality of two, relating to the number of violating data paths utilizing node D. To sort the node information in the data set, the computing device may then determine, in operation 520, whether a bin or other sub-division of the bucket coincides with the criticality of the node is present within the bucket. If the bucket does contain a bin relating to the node criticality, then the computing device may store the node information in the appropriate bin in operation 530. To store the node information, the computing device may store any representation of the retrieved node, such as a node identifier. Assuming that node D 326 is the first node to be stored by the computing device in the bucket, no bins will have been created in the bucket for storage of node information. Thus, the computing device may create a bin in the bucket coinciding with the retrieved node in operation 540. For example, the computing device may create a bin in the bucket where nodes of a criticality of "two" may be stored. In addition, once the bin is created, the computing device may insert the created bin in the bucket in some order in relation to the other bins in the bucket in operation 550. In one embodiment, the bins may be ordered within the bucket in descending order of criticality, as shown below in more detail. However, it should be appreciated that the bins may be sorted in any manner as determined by the computing device. Once the created bin has been inserted into the bucket, the node information may be added to the created bin in operation 560.

Figure 6:
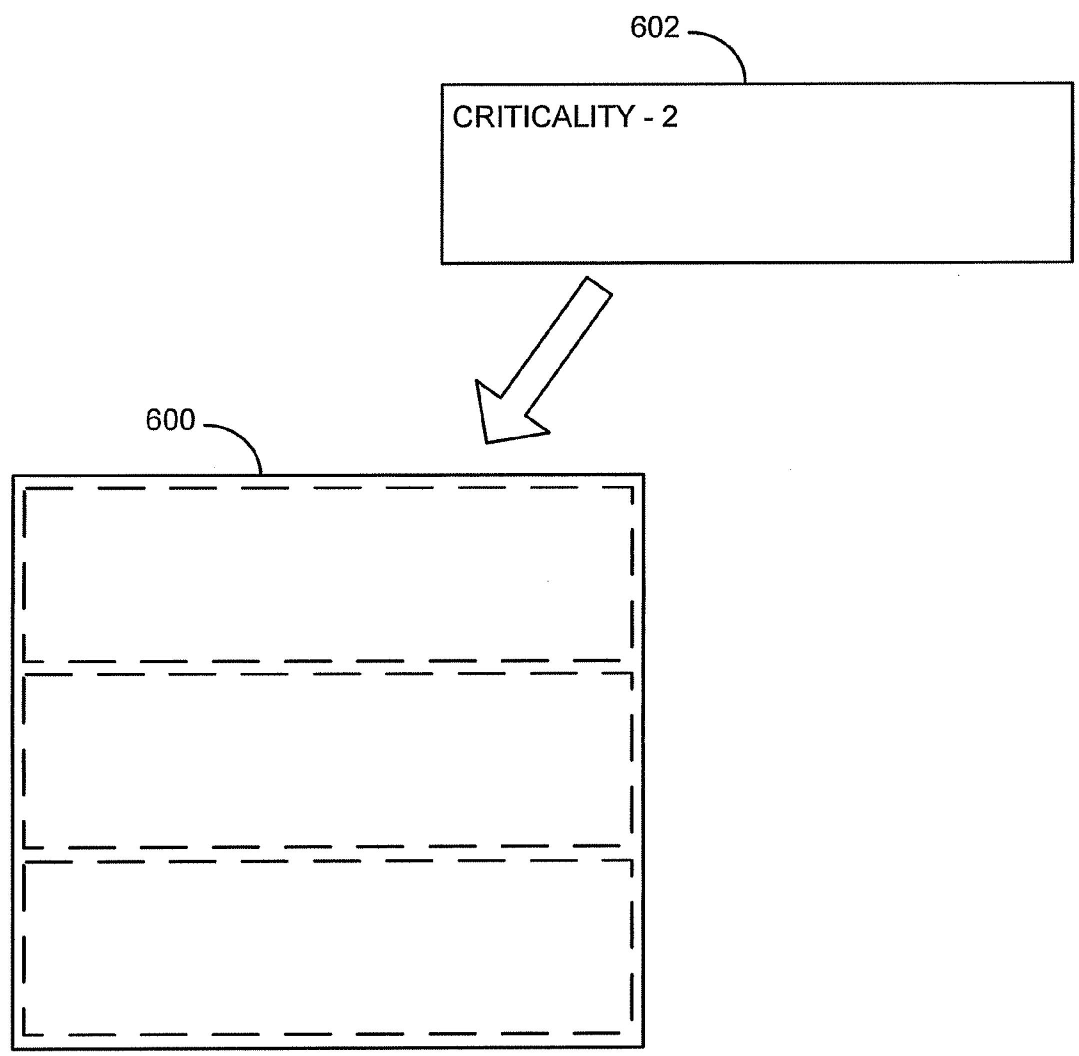
FIG. 6 is a graphical representation illustrating a data set of identified nodes with hold time violations and the insertion of a first bin of a particular node criticality into the data set.
Figure 7:
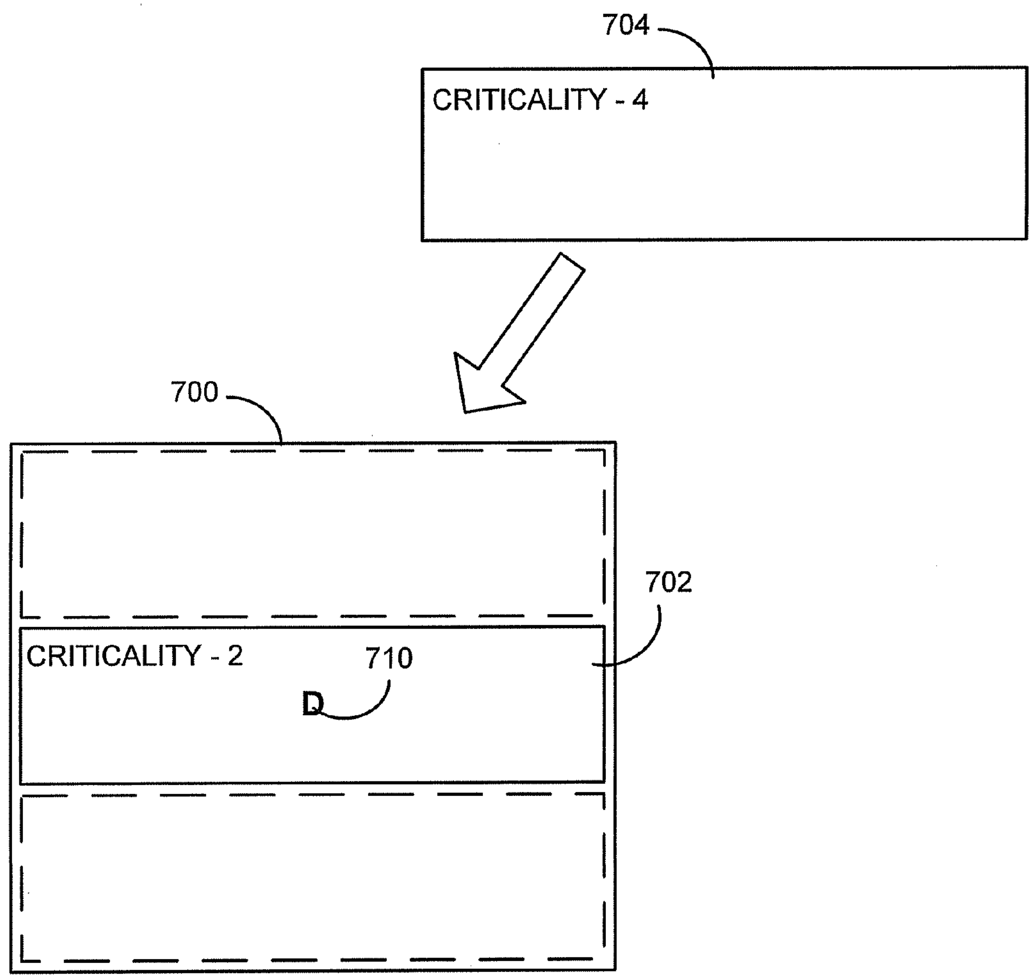
FIG. 7 is a graphical representation illustrating the data set of identified nodes with hold time violations including a first bin of a particular node criticality and the insertion of a second bin of a second particular node criticality into the data set.

FIG. 6 is a graphical representation illustrating a data set of identified nodes with hold time violations and the insertion of a bin of a particular node criticality into the data set. The particular example illustrated in FIG. 6 can be understood through the example provided above with relation to the flowchart of FIG. 5. As mentioned, node D 326 of FIG. 3*b* may have a determined criticality of two. Thus, once the criticality information is retrieved for the node, the computing device may analyze the bucket 600 to determine if a bin is present that stores nodes of a similar criticality, such as a criticality of two. Because the bucket is, at this point in the example, empty, no bin is present. Therefore, the computing device may create such a bin 602 and associate the bin with the node criticality of two. Once created, the bin 602 may be inserted in the bucket 600 such that all subsequently retrieved nodes with a criticality of two may also be stored within the bin. The storing of node D 710 to the newly created bin is shown in FIG. 7. More particularly, node D 710 is stored in the two-criticality bin 702 within the bucket data set 700, as shown.

The other nodes of the electrical circuit may be added to the bucket in a similar manner. Continuing the above example in relation to the flowchart of FIG. 5, a second node may be analyzed from the circuit and the criticality of the second node may be determined. For example, node M 342 of FIG. 3*b* may be analyzed and a criticality of four may be associated with the node, as described. Returning to FIG. 5, the computing device may determine in operation 520 that the bucket does not contain a bin for nodes with a criticality of four. As shown in FIG. 7, the bucket 700 contains one bin 702 for nodes with a criticality of two. Thus, the computing device may create a second bin 704 for retrieved nodes that have a criticality of four. This four-criticality bin 704 may then be inserted into the bucket 700 so that other nodes with the same criticality may also be stored in the bin. Further, the bins of the bucket may be ordered in any particular order. For example, the four-criticality bin 704 may be inserted into the bucket 700 above the two-criticality bin 702 such that the bins are arranged within the bucket in descending order based on the criticality of the nodes within each bin. Once the four-criticality bin 704 is inserted into the bucket 700, an indicator of node M may be added to the four-criticality bin. In this manner, the computing device may continue to place nodes of the circuit within the bucket in an order conducive to correcting the hold time violations of the circuit in an efficient manner.

Figure 8:
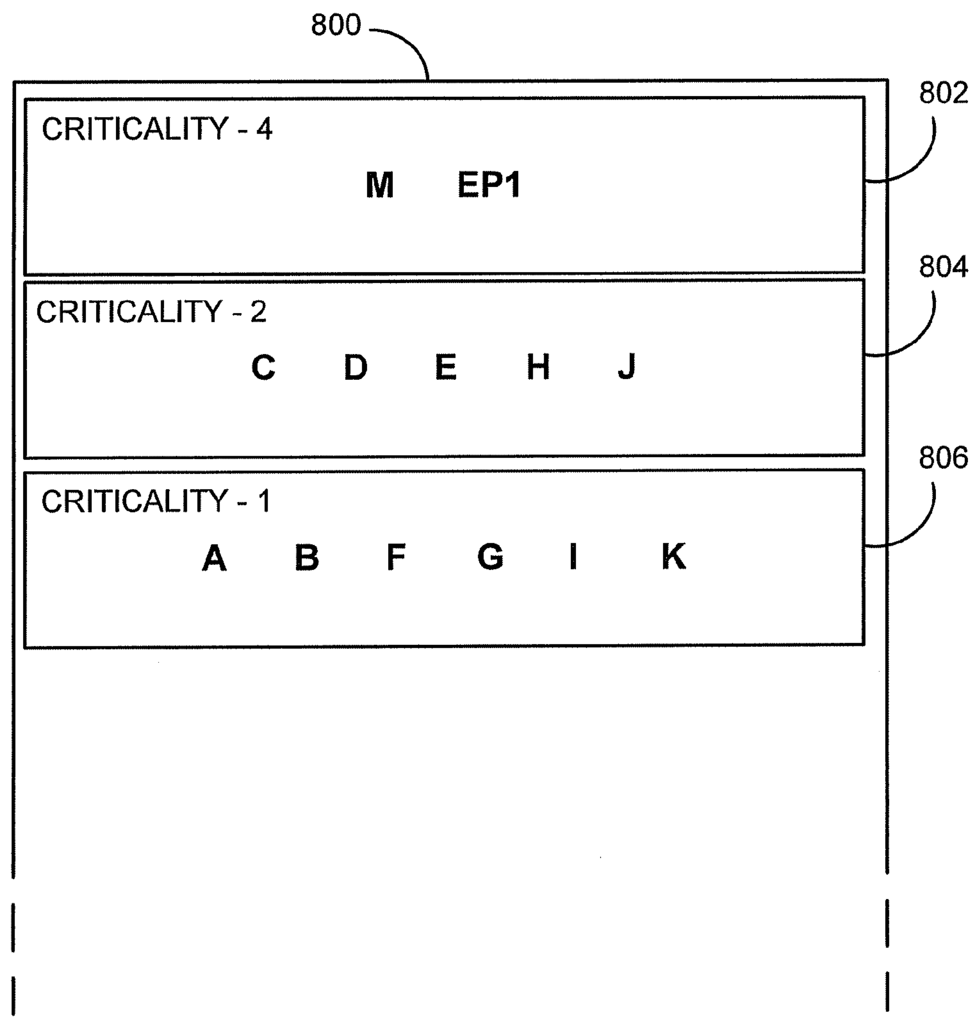
FIG. 8 is a graphical representation illustrating the data set of identified nodes with hold time violations for the nodes of the circuit diagram of FIG. 3, with the identified nodes located in bins arranged in descending order based on the criticality of the nodes.

FIG. 8 illustrates the data set 800 of identified nodes with hold time violations for the nodes of the circuit diagram of FIGS. 3*a* and 3*b*, with the identified nodes located in bins arranged in descending order based on the criticality of the nodes. More particularly, as shown in FIG. 3*b*, node M 342 and node EP1 344 has a criticality of four based on the four identified violating paths that utilize node M, namely violating paths EP1-1, EP1-2, EP1-3 and EP1-4. Similarly, node C 324, node D 326, node E 328, node H 334 and node J 338 have a criticality of two and node A 320, node B 322, node F 330, node G 332, node I 336 and node K 340 have a criticality of one. Returning to FIG. 8, a bucket data set 800 is shown for the identified nodes of the circuit of FIGS. 3*a* and 3*b*. More particularly, nodes M and EP1 are shown stored in the bin for node-criticalities of four 802, nodes C, D, E, H and J are stored in the bin for node-criticality of two 804 and nodes A, B, F, G, I and K are stored in the bin for node-criticality of one 806. In addition, the bins may be ordered within the bucket 800 in descending order based on the criticality of nodes within the bins. For example, the bin for node-criticalities of four 802 may be near the top of the bucket 800, followed in order by the bin for node-criticality of two 804 and the bin for node-criticality of one 806. In general, however, the bins and nodes within the bins may be ordered in any manner useful to the computing device. Therefore, by performing the operations described above, the computing device may identify the criticality of one or more nodes of a circuit design and order said nodes in a bucket data set in relation to the determined node criticalities.

Figure 9:
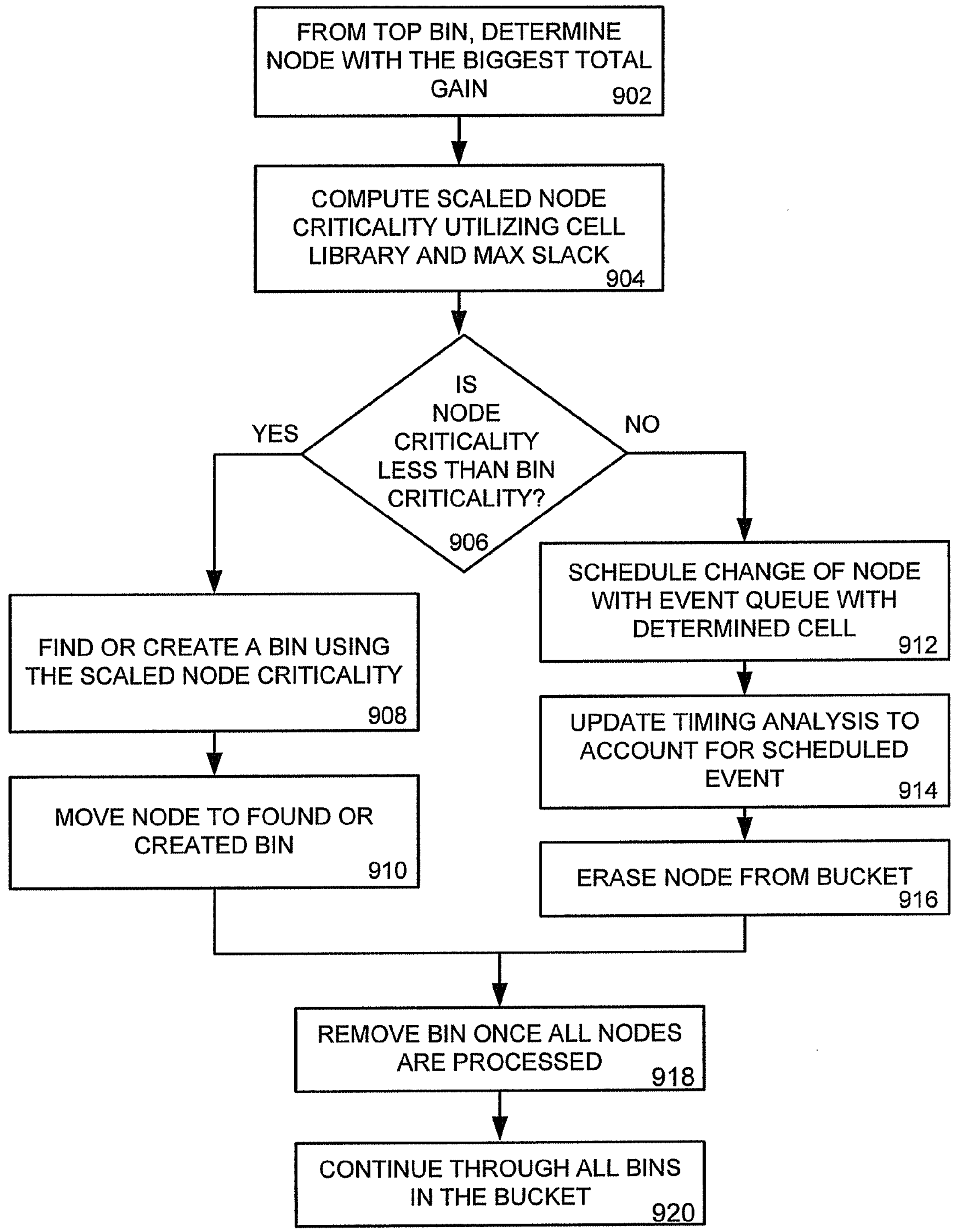
FIG. 9 is a flowchart of a method for assigning one or more change events for the nodes stored in a data set sorted based on node criticality to account for one or more hold time violations of an electronic circuit design.

When correcting for the hold time violations present in the circuit design, the computing device may utilize the node information stored in the bucket to aid in minimizing or decreasing the number of alterations to the circuit. For example, FIG. 9 is a flowchart of one method for assigning one or more change events for the nodes stored in a data set sorted based on node criticality to account for one or more hold time violations of an electrical circuit design. The operations of the method of FIG. 9 may be performed by a computing device, such as that described above. In addition, the operations of FIG. 9 may be performed to reduce the number of alterations and/or delay components inserted into the circuit design to account for the hold time violations, thereby reducing the overall cost and time required to make the hold time corrections.

Beginning in operation 902, the computing device may first access one or more nodes stored in the topmost bin of the bucket and determine which of the nodes in that bin has the biggest total gain. For example, utilizing the bucket of FIG. 8, the computing device may select node M from the topmost bin 802. In this example, because node M is the only node stored in the topmost bin 802, the computing device may not determine the total gain of node M. Rather, the computing device may continue on to operation 904 described below. However, if more than one node is stored in the topmost bin, the computing device may determine the node within the bin with the biggest total gain. To determine the total gain for any one node of the circuit, the computing device may determine several calculations related to the node based on the obtained timing information of the node. For example, the computing device may determine a node flexibility for the node. In general, the node flexibility is the ratio of the available setup time slack to the hold time violation at the node. As described above, the electrical circuit may be constrained by a maximum allowable time such that the circuit executes within the timing constraint. In other words, the delay added at any one node is constrained by the setup time slack in that adding too much delay to correct the hold time violation may cause a setup time violation. In general, the node flexibility determined by the computing device provides an indication of the amount of delay that may be added at any one node.

To determine the total gain for any node analyzed by the computing device, the computing device may analyze the node flexibility, the type of node of the circuit and the hold time violation at that node. In general, the total gain for a node indicates the node within the bin that is the best candidate for correcting hold time violations, i.e. the node with the highest hold time violation and highest flexibility for correction. Thus, once the computing device determines which node in the topmost bin has the highest total gain in operation 902, the computing device may begin to process that node.

To begin processing the node, the computing device may compute a scaled criticality for the selected node in operation 904. In general, the scaled criticality for any one node is defined as the maximum number of fixable paths through the node given the cell library of delay elements and the available setup time slack at the node. As described above, each node is constrained by a setup time to maintain the overall speed performance of the electrical circuit. Thus, in operation 904, the computing device may analyze the delay elements, or cells, available to correct the one or more hold time violations at the node to determine if any of the available cells cause the node to violate the setup time slack at that node. For example, a potential cell to account for a hold time violation may be analyzed by the computing device that creates a delay of 1.5 picoseconds at the node. However, the max slack for the circuit may be such that a delay of 1.5 picoseconds in the data path would create a setup time violation. Thus, such a delay device may be not utilized to correct the hold time violation at the node.

In some circumstances, the scaled criticality calculation may result in the criticality of a node being adjusted. For example, the computing device may determine, based on the scaled criticality calculation, that only one available delay device or cell may correct the hold time violation at the node. However, the available cell may only correct one of the violating paths that utilize the node while the other added delay does not fully account for one or more of the violating paths. For example, node M 342 of FIG. 3*b* has a calculated criticality of four. However, after performing the above calculations, the computing device may determine that only two of the four violating paths through node M 342 may be corrected from the library of cells or delay devices available to correct the hold time violations. Thus, in these cases, the criticality of the node may be adjusted down to account for the number correctable violating paths for that node. Continuing the example, the criticality for node M 342 may then be scaled to a criticality of two by the computing device. The other violating paths that utilize node M may then be corrected at other nodes along the violating path. In this manner, the computing device may analyze the setup time slack and available cell library to determine a scaled criticality for a node in operation 904. In addition, the computing device may also determine one or more viable cells or delay devices that may be inserted or swapped into the circuit design to account for the hold time violations at that node. These potential cells may be used by the computing device in operation 912 described in more detail below.

In operation 906, the computing device may determine if the scaled node criticality is less than the criticality of the bin. For example, the computing device may determine that the scaled criticality of node M is two, as described above. However, prior to scaling, the criticality of the node M was four, such that node M is stored in the bin for node-criticalities of four. If the computing device determines that the scaled node criticality is less than the bin criticality, the computing device may locate or create a bin for the scaled node criticality. Continuing the above example, the computing device may analyze the bucket to determine if any bins exist for nodes with a criticality of two to match the scaled criticality of node M. If one does not exist, a bin for node-criticalities of two may be created in operation 908. Upon locating or creation of a new bin, the computing device may then move the scaled node into the proper bin in operation 910 for processing at a later time. In the above example, the computing device may move node F into a bin for node-criticalities of two.

Returning to operation 906, however, if the computing device determines that the scaled node criticality is the same as or bigger than the criticality of the node prior to scaling, the device may then process the node to correct one or more hold time violations through the node. First, the computing device may schedule a change at the node in operation 912 by adding the change to the event queue with the best cell candidate noted in operation 904 above. As mentioned, the change event may include the addition of delay device and/or swapping of a device for a slower propagating device to account for one or more hold time violations at the node. The added delay device or swapped device may be determined by the computing device in operation 904 above. In addition, the computing device may logically adjust the timing information of the circuit in response to the scheduled change in operation 914.

As should be appreciated, the alteration made by the computing device in operation 914 may correct one or more hold time violations in one or more nodes. For example, an addition of a delay device in the circuit of FIGS. 3*a* and 3*b* at node M 342 may correct one or more of the violating paths utilizing that node, such as EP1-1 and EP1-2. In general, the scheduled event may correct any number of the violating paths utilizing the altered node. In operation 916, the computing device may remove the retrieved node from the bucket as the node has been processed by the computing device.

In addition, the computing device may determine if any additional nodes remain in the topmost bin in the bucket in operation 918. Thus, whether the node is moved into another bin based on the scaled criticality of the node (operation 910) or removed from the bin as having been processed by the computing device (operation 916), the topmost bin of the bucket may have no remaining nodes. In this case, the computing device may remove the topmost bin and proceed to the next bin in order, as shown in operation 920. Using the example of FIG. 8, once node M of the bin for node-criticality of four 802 is removed, either through transfer to another bin based on the scaled criticality of the node or through processing by the computing device, the bin for node-criticality of four may be removed or deleted from the bucket 800. Additionally, the computing device may then proceed to the next highest bin, in this case the bin for node-criticality of three 804 and begin the operations of FIG. 9 to process the nodes in this bin. In this manner, the computing device may process each node in the bins of the bucket to correct or account for the hold time violations of the circuit design.

By utilizing the operations and methods described above, a computing device or other apparatus may identify and/or classify nodes of a microchip or microprocessor design associated with a hold time violation to account for the timing violations. More particularly, the apparatus may select the node or nodes with the highest criticality as locations for one or more delay elements to account for the hold time violations occurring along the data path associated with the node or nodes. By ordering the potential placement for correcting the hold time violations based on the criticality of such placements, the number of circuit design alterations needed to account for the hold time violations may be reduced or minimized, resulting in fewer changes and fewer delay elements used. This process may thus streamline the correction of hold time violations encountered in a circuit design and reduce cost, such as in time required to correct the violations and the number of elements added to the design. Thus, the methods included herein may provide a more cost effective way to correct one or more hold time violations within a circuit design.

Figure 10:
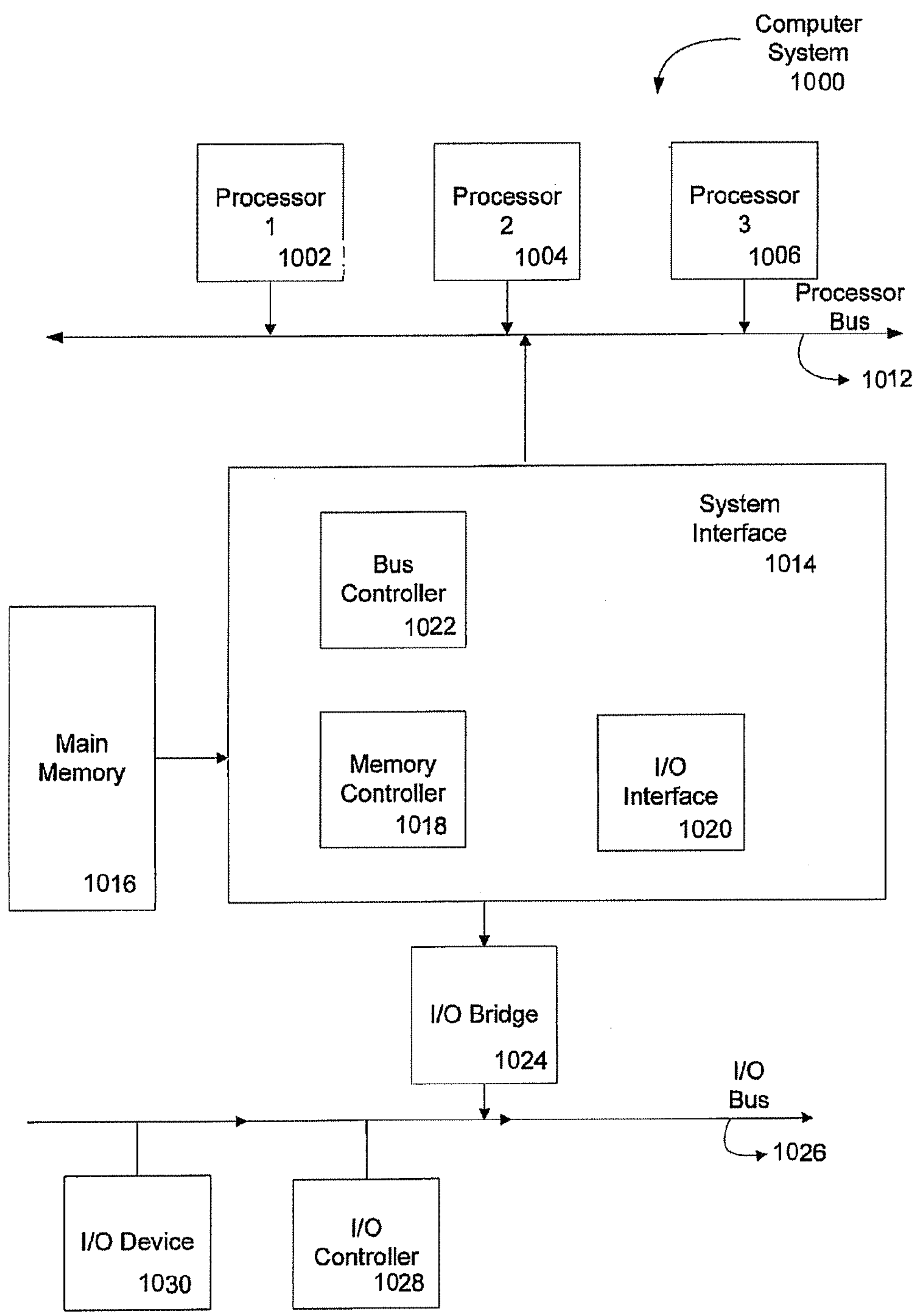
FIG. 10 is a block diagram illustrating an example of a computing device which may be used in implementing embodiments of the present invention.

As mentioned above, the methods and operations described herein may be performed by an apparatus or computing device. FIG. 10 is a block diagram illustrating an example of a computing device or computer system 1000 which may be used in implementing embodiments of the present invention. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1018 for interfacing a main memory 1016 with the processor bus 1012. The main memory

1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1016. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 1, 2, 4, 5 and 9 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for accounting for one or more hold time violations of an electrical circuit design, the method comprising:

utilizing at least one processing device to perform the following operations:

analyzing an electrical circuit design to determine one or more hold time violations;

associating a criticality to one or more nodes of the electrical circuit design, the criticality relating to a number of hold time violations determined at the one or more nodes;

storing indicators of the one or more nodes and the associated criticality of the one or more nodes in a data set in at least one memory device;

generating a change event queue to account for the one or more hold time violations based on the associated criticality of the one or more nodes in the data set; and altering the electrical circuit design based on the change event queue to account for the one or more hold time violations of the electrical circuit design.

2. The method of claim 1 further comprising:

ordering the indicators of the one or more nodes in the data set in a descending order of criticality.

3. The method of claim 2 wherein the ordering operation comprises:

partitioning the data set into one or more bins;

associating a criticality for each of the one or more bins such that the one or more nodes are sorted into the one or more bins based on the criticality associated with the one or more nodes; and ordering the one or more bins in a descending order of the associated criticality.

4. The method of claim 3 wherein the generating operation comprises:

selecting one or more nodes from the topmost bin of the data set such that nodes with the highest associated criticality of the data set are selected prior to nodes with a lower associated criticality.

5. The method of claim 1 wherein the altering operation comprises:

delaying one or more data paths of the electrical circuit design.

6. The method of claim 5 wherein the delaying operation comprises:

inserting a delay element into the one or more data paths of the electrical circuit design.

7. The method of claim 5 wherein the delaying operation comprises:

swapping a component of the one or more data paths with a slower propagating component.

8. The method of claim 1 further comprising:

reanalyzing the electrical circuit design to determine one or more remaining hold time violations after altering the electrical circuit design.

9. The method of claim 1 further comprising:

scaling the criticality to the one or more nodes of the electrical circuit design based on an available buffer library and timing information about the circuit design.

10. A computing device for designing an electrical circuit comprising:

a processing device; and a non-transitory computer-readable medium having stored thereon data representing sequences of instructions that, when executed by the processing device, cause the processing device to perform the following operations:

detecting one or more hold time violations of an electrical circuit design at one or more endpoints of the electrical circuit design;

tracing along at least one data path for each of the one or more hold time violations, the at least one data path comprising one or more nodes of the electrical circuit design;

computing a criticality for the one or more nodes of each of the at least one data paths, the criticality associated with a number of data paths associated with the one or more nodes;

creating a data set comprising indicators of the one or more nodes and the computed criticality of the one or more nodes;

ordering the data set based on the criticality of the one or more nodes;

generating a change event to add a delay component in the electrical circuit design at a first node of the one or more nodes in the data set; and adding the delay component to the electrical circuit design based on the change event.

11. The computing device of claim 10 wherein the instructions further cause the processing device to perform an operation such that the ordering operation comprises:

ordering the indicators of the one or more nodes in the data set in a descending order of the criticality.

12. The computing device of claim 11 wherein the instructions further cause the processing device to perform operations such that the ordering operation further comprises:

partitioning the data set into one or more bins;

associating a criticality for each of the one or more bins such that the one or more nodes are sorted into the one or more bins based on the criticality associated with the one or more nodes; and ordering the one or more bins in a descending order of the associated criticality.

13. The computing device of claim 10 wherein the instructions further cause the processing device to perform operations such that the tracing operation comprises:

determining nodes of the at least one data path associated with at least one of the one or more endpoints of the electrical circuit design; and assigning a path identifier to the determined nodes of the at least one data path.

14. The computing device of claim 13 wherein the instructions further cause the processing device to perform operations such that the tracing operation comprises:

determining nodes of one or more violating sub paths stemming from the at least one data path associated with the at least one of the one or more endpoints of the electrical circuit design; and assigning a sub path identifier to the determined nodes of the one or more violating sub paths.

15. The computing device of claim 10 wherein the instructions further cause the processing device to perform an operation comprising:

scaling the computed criticality of the one or more nodes in the data set based on a library of available delay components.

16. The computing device of claim 15 wherein the instructions further cause the processing device to perform an operation comprising:

reordering the data set based on the scaled criticality of the one or more nodes in the data set.

17. The computing device of claim 10 wherein the instructions further cause the processing device to perform an operation comprising:

removing the first node from the data set after generating the change event associated with the first node.

18. The computing device of claim 10 wherein the instructions further cause the processing device to perform an operation such that the generating operation comprises:

creating a change event to add a delay component in the electrical circuit design at each of the one or more nodes in the data set.

19. A method for designing a microchip, the method comprising:

utilizing at least one processing device to perform the following operations:

detecting one or more endpoints of a microchip design, the endpoints comprising inputs to a state-storing device and outputs of the microchip design;

locating at least one data path for each of the one or more endpoints, the at least one data path comprising one or more nodes of the microchip design;

creating a path identifier for the at least one data path for each of the one or more endpoints;

assigning the path identifier to the one or more nodes for the at least one data path;

computing a criticality for the one or more nodes of each of the at least one data path, the criticality associated with a number of data paths associated with the one or more nodes;

creating a bucket data set in at least one memory device, the bucket data set associated with the computed criticality of the one or more nodes of each of the at least one data path;

accessing the bucket data set to generate a change event for at least one of the one or more nodes; and adding an electrical component to the microchip design in response to the change event.

20. The method of claim 19 further comprising:

ordering the bucket data set in a descending order of the criticality of the one or mode more nodes of each of the at least one data path.

* * * * *